United States Patent
Haug et al.

(10) Patent No.: US 6,753,090 B2
(45) Date of Patent: Jun. 22, 2004

(54) SURFACE LAYER AND PROCESS FOR PRODUCING A SURFACE LAYER

(75) Inventors: Tilman Haug, Weissenhorn (DE); Michael Scheydecker, Nersingen (DE); Oliver Storz, Blaustein (DE); Karl-Ludwig Weisskopf, Rudersberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/912,418

(22) Filed: Jul. 26, 2001

(65) Prior Publication Data

US 2002/0034643 A1 Mar. 21, 2002

(30) Foreign Application Priority Data

Jul. 26, 2000 (DE) .......................................... 100 36 262

(51) Int. Cl.[7] .............................. B32B 9/00; B32B 7/04
(52) U.S. Cl. ...................... 428/472; 428/469; 428/697; 428/699; 428/701; 428/702
(58) Field of Search ................................. 428/457, 469, 428/472–472.2, 689, 697, 699, 701, 702

(56) References Cited

U.S. PATENT DOCUMENTS

| | | | | |
|---|---|---|---|---|
| 4,919,773 A | * | 4/1990 | Naik | 204/38.4 |
| 5,309,874 A | * | 5/1994 | Willermet et al. | 123/90.51 |
| 6,051,277 A | * | 4/2000 | Claussen et al. | 427/376.3 |
| 6,436,519 B2 | * | 8/2002 | Holzschuh | 428/216 |

FOREIGN PATENT DOCUMENTS

| | | |
|---|---|---|
| DE | 4102495 | 7/1992 |
| DE | 19605858 | 8/1997 |
| DE | 19750599 | 7/1998 |
| EP | 0496935 | 8/1992 |

* cited by examiner

Primary Examiner—Deborah Jones
Assistant Examiner—G. Blackwell-Rudasill
(74) Attorney, Agent, or Firm—Crowell & Moring LLP

(57) ABSTRACT

The invention relates to a surface layer which comprises a plurality of layers, of which one layer is a ceramic wear-resistant layer and another layer is a transition layer to a metallic substrate element. The transition layer comprises intermetallic phases and is formed by a reaction from the materials of the substrate element and of the ceramic layer.

12 Claims, 1 Drawing Sheet

SURFACE LAYER AND PROCESS FOR PRODUCING A SURFACE LAYER

CROSS-REFERENCE TO RELATED APPLICATIONS

This application is cross-referenced to U.S. application Ser. No. 09/912,451 filed on Jul. 26, 2001 (which corresponds to German priority document 100 36 264.8, filed Jul. 26, 2000).

BACKGROUND AND SUMMARY OF THE INVENTION

This application claims the priority of German patent application 100 36 262.1, filed Jul. 26, 2000, the disclosure of which is expressly incorporated by reference herein.

The invention relates to a surface layer comprising a plurality of layers, of which one layer is a transition layer to a substrate element.

German patent document DE 197 50 599 A1 discloses a design element which comprises an $Al_2O_3$-containing surface layer with embedded high-temperature-resistant aluminides. To produce a design element of this type, a sintered, porous ceramic body is placed in a die-casting mold and is infiltrated with aluminum under pressure. During the infiltration, the ceramic body reacts with the aluminum, forming the above-mentioned aluminides. The design element generally only fills parts of the component, and consequently, the component consists partially of aluminum and partially, in particular at the component regions which are subject to frictional loads, of the design element.

To produce the design element in accordance with German patent document DE 197 50 599 A1, it is necessary, in a complex way, to mold, sinter and machine a ceramic body before it is infiltrated with aluminum during the die-casting. Furthermore, there is a distinct transition between the design element and the remaining component, which functions as a substrate element. This transition has an adverse affect on the adhesion between the elements.

Accordingly, the invention is based on the object of providing a surface layer which is less expensive than that of the prior art and in which the adhesion between the surface layer and a substrate element is improved.

The object is achieved according to the invention by a surface layer comprising a plurality of layers, of which one layer is a transition layer to a substrate element, the surface layer includes a ceramic layer, which contains a chemically bonded metal, the substrate element is a metallic substrate element, and the translation layer contains intermetallic phases including the metal of the substrate material and the metal of the ceramic material and by a process for producing the surface layer.

The surface layer according to the invention includes at least two part-layers on a metallic substrate element. In this arrangement, one layer, which faces the surface, is substantially a ceramic layer, whereas another layer (transition layer), which faces the substrate material, contains intermetallic phases. These are composed of the metal of the substrate element and a metal which is chemically bonded in the ceramic layer. As the functional layer, the ceramic layer is responsible for protecting the substrate element against wear or for acting as a thermal barrier for this element. The transition layer is composed in the form of a chemical bond comprising materials of the substrate element and materials of the ceramic layer. Accordingly, on account of the chemical bond, very good adhesion is ensured between the ceramic layer and the substrate element, which is of importance in particular when the surface layer is subjected to wear. The surface layer according to the invention serves as a wear-resistant layer and/or a thermal barrier layer for metal components, which are subjected to high frictional and thermal loads, in particular in the drive train of automobiles, e.g. in a cylinder crankcase, in a cylinder head, on pistons or in a transmission casing. The surface layer according to the invention can also be used in friction pairings, such as for example in brake units.

A particularly good chemical bonding between the ceramic layer and the substrate material is established if the ceramic layer consists of an oxide ceramic which can be reduced by the metal of the substrate element. In particular, titanium dioxide ($TiO_2$) and silicon dioxide ($SiO_2$) are very well suited. In this case, intermetallic phases are preferably formed according to the following equation:

$$Me_KO + Me_T \rightarrow Me_KMe_T + Me_TO \qquad \text{Eq. 1.}$$

In this equation, $Me_K$ represents the chemically bonded metal of the ceramic layer, O represents oxygen and $Me_T$ represents the metal of the substrate layer. It is in this case possible for the metal of the ceramic layer to be a mixed oxide which contains a plurality of metals in the manner of $Me_{K1}Me_{K2}O$ (e.g. spinels, ilmenite or silicates). Coefficients of stoichiometry are not taken into account in the outline details of chemical compounds and reactions.

The ceramic layer preferably comprises the oxides of titanium or of silicon or mixtures thereof. The intermetallic phases, which are formed in this case accordingly, contain titanium or silicon. These two metals form particularly stable and high-temperature-resistant intermetallic phases which have very good mechanical properties.

Alloys based on aluminum or iron are preferably used for the substrate element. These metals are particularly successful at forming intermetallic phases with ceramic materials and at the same time are eminently suitable as structural materials for metallic components.

The invention further includes a process for producing a surface layer. In this process, a ceramic layer is applied to a metallic substrate element. A reaction between the metal of the substrate element and the chemically bonded metal in the ceramic is brought about by introduction of energy, which may take place either during the application of the layer (in situ) or by a subsequent heat treatment. During this reaction, a transition layer, which contains intermetallic phases and ceramic phases in accordance with Eq. 1, is produced in the reaction zone. The reaction-bonded transition layer is securely joined to both the substrate element and the ceramic layer, which according to the invention ensures very good adhesion.

The ceramic layer can be applied to the substrate element by most conventional coating processes. These include physical and chemical deposition processes, such as sputtering, sole-gel processes, electrodeposition or CVD coating. However, painting techniques (e.g. dip painting or spraying) or slip techniques as are customary in the production of ceramics are particularly suitable, allowing a particularly inexpensive layer to be produced. In the present context, the term slip technique is understood as meaning the application of a suspension which contains solvent and solids to a surface, the solvent being removed from the applied suspension so that a layer remains in place. Furthermore, thermal spraying processes, such as flame spraying, high-speed flame spraying, plasma spraying, wire arc spraying or kinetic cold gas compacting are expedient coating processes. The thermal spraying processes ensure a particularly dense layer and can likewise be produced at low cost.

Particularly with the abovementioned thermal spraying processes, energy which brings about the reaction between the substrate element and the ceramic layer may be introduced in situ. This takes place if a ceramic powder, when it comes into contact with the substrate material, is at a temperature which is sufficient to initiate a reaction. With other coating processes, an additional heat treatment is introduced. The heat treatment is expediently selective, i.e. only those regions of the substrate element which are provided with the ceramic layer are heated. This is particularly expedient since in this way the substrate element is not exposed to any additional loading, for example from corrosion or a microstructural transition. Concentrated thermal radiation (e.g. from high-energy infrared lamps), laser irradiation or induction heating are particularly suitable for the selective heating.

The surface layer according to the invention and the process according to the invention for producing the surface layer are described in more detail in the examples which follow.

Other objects, advantages and novel features of the present invention will become apparent from the following detailed description of the invention when considered in conjunction with the accompanying drawings.

BRIEF DESCRIPTION OF THE DRAWINGS

The sole FIGURE shows the basic structure of a surface layer with a ceramic layer, a transition layer and a substrate element according to the invention.

DETAILED DESCRIPTION OF THE DRAWING

Figure 1:
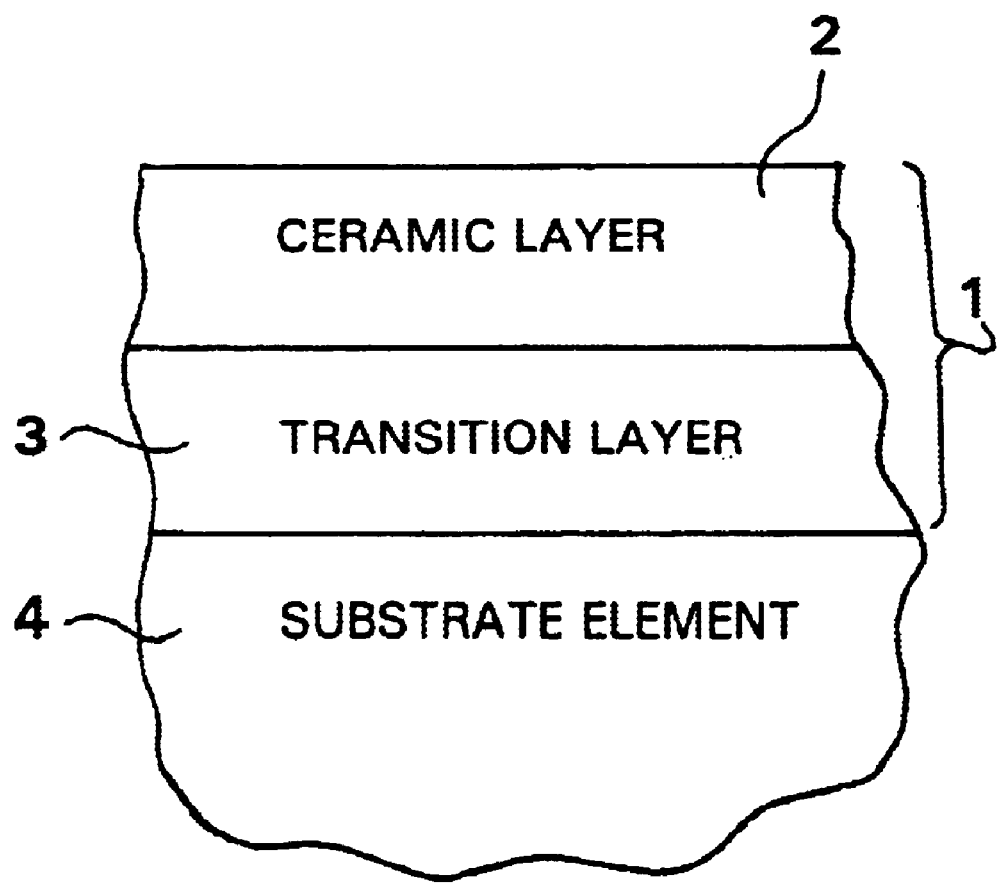

The surface layer 1 shown in FIG. 1 contains a ceramic layer 2, a transition layer 3 and a substrate element 4. The ceramic layer 2 substantially contains titanium oxide ($TiO_2$) The substrate element 4 is a die-cast element consisting of aluminum alloy AlSi9Cu3. The transition layer 3 is formed from a reaction between the ceramic layer 2 and the substrate element 4 and contains titanium aluminides ($Al_3Ti$ and TiAl) and aluminum oxide ($Al_2O_3$) and $TiO_2$.

EXAMPLE 1

Cylinder barrels of a cylinder crankcase made from the alloy AlSi9Cu3 are coated with titanium oxide in a plasma spraying process. The $TiO_2$ particles have diameters of between 10 $\mu$m and 50 $\mu$m. The particles are heated to approx. 1800° C. in the plasma gas (argon/hydrogen), so that they melt at least partially and, in the softened state, come into contact with the surface of the cylinder barrel. The resulting layer thickness is approx. 200 $\mu$m.

The $TiO_2$ particles, which are in the softened or molten state when they come into contact with the cylinder barrel, at least partially react with the surface of the cylinder barrel. In the process, the transition layer 3 in accordance with Eq. 1 is formed. In this case, the transition layer 3 has a thickness of approx. 1 $\mu$m and contains the phases $Al_3Ti$ and aluminum oxide, as well as residues of $TiO_2$ and aluminum. The interfaces between the ceramic layer 2, which consists of $TiO_2$, the transition layer 3 and the substrate element 4 are gradual. The surface layer produced in this way exhibits very good adhesion to the cylinder barrel and is used as a wear-resistant layer between a moving piston and the cylinder crankcase.

EXAMPLE 2

A water-based silicon oxide suspension ($SiO_2$) is sprayed onto the cylinder barrels of a cylinder crankcase (AlSi9Cu3).
The spraying takes place as a painting operation with the aid of air pressure and a spray gun. The sprayed $SiO_2$ layer is dried and then subjected to a heat treatment. The heat treatment takes place by using infrared heat radiators. The energy is introduced in such a way that the surface layer is held constantly at a temperature of between 520° C. and 580° C. for approx. 5 min. There is no incipient fusion of the cylinder crankcase during this treatment. On the other hand, liquid phase constituents, which enter into a reaction with the $SiO_2$ of the ceramic layer 2 in accordance with Eq. 1, are formed locally on the surface of the cylinder barrel in accordance with the phase diagram of the alloy. Aluminum silicides and aluminum oxides are formed in the transition layer 3, and residues of aluminum and $SiO_2$ also remain. The thickness of the transition layer is approx. 30 $\mu$m.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A surface layer, comprising:

a substrate element;

a plurality of layers, of which one layer is a transition layer to the substrate element;

wherein the surface layer includes a ceramic layer containing a chemically bonded metal, and wherein the substrate element is a metallic substrate element; and wherein the transition layer contains intermetallic phases comprising the metal of the substrate element and the metal of the ceramic layer.

2. The surface layer according to claim 1, wherein the ceramic layer comprises an oxide ceramic.

3. The surface layer according to claim 1, wherein the ceramic layer comprises at least one of a titanium-containing and silicon-containing oxide ceramic.

4. The surface layer according to claim 2, wherein the ceramic layer comprises at least one of a titanium-containing and silicon-containing oxide ceramic.

5. The surface layer according to claim 1, wherein the substrate element comprises an alloy material based on at least one of aluminum and iron.

6. The surface layer according to claim 2, wherein the substrate element comprises an alloy material based on at least one of aluminum and iron.

7. The surface layer according to claim 3, wherein the substrate element comprises an alloy material based on at least one of aluminum and iron.

8. The surface layer according to claim 2, wherein the transition layer contains aluminum titanates and aluminum oxide.

9. The surface layer according to claim 3, wherein the transition layer contains aluminum titanates and aluminum oxide.

10. The surface layer according to claim 5, wherein the transition layer contains aluminum titanates and aluminum oxide.

11. A surface layer, comprising:

a substrate element;

a plurality of layers, of which one layer is a transition layer to the substrate element;

wherein the surface layer includes a ceramic layer containing a chemically bonded metal, and wherein the substrate element comprises aluminum; and wherein the transition layer contains intermetallic phases comprising the metal of the substrate element and the metal of the ceramic layer.

12. A surface layer, comprising:

a substrate element;

a plurality of layers, of which one layer is a transition layer to the substrate element;

wherein the surface layer includes a ceramic layer containing a chemically bonded metal, and wherein the substrate element is a metallic substrate element;

wherein the transition layer contains intermetallic phases comprising the metal of the substrate element and the metal of the ceramic layer; and wherein the transition layer contains aluminum titanates and aluminum oxide.

* * * * *